Sept. 9, 1969  G. FRANCIA  3,466,119
MULTIPLE MIRRORED APPARATUS UTILIZING SOLAR HEAT
Filed April 7, 1966  5 Sheets-Sheet 1
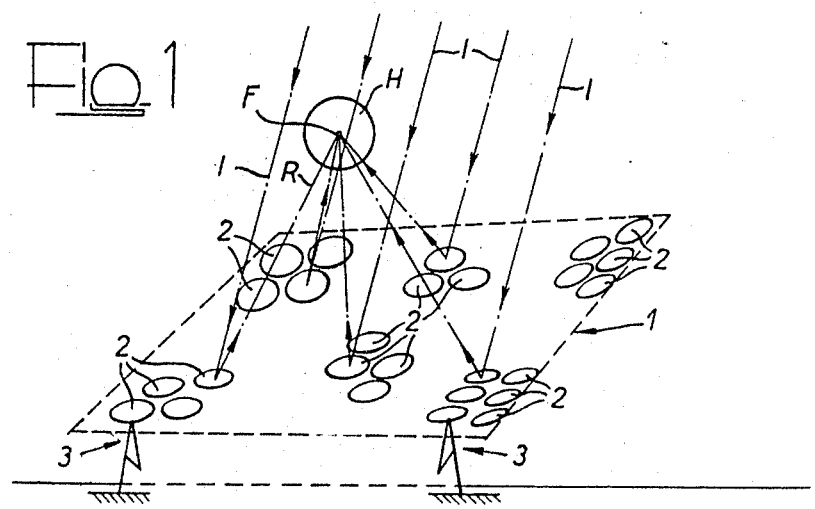
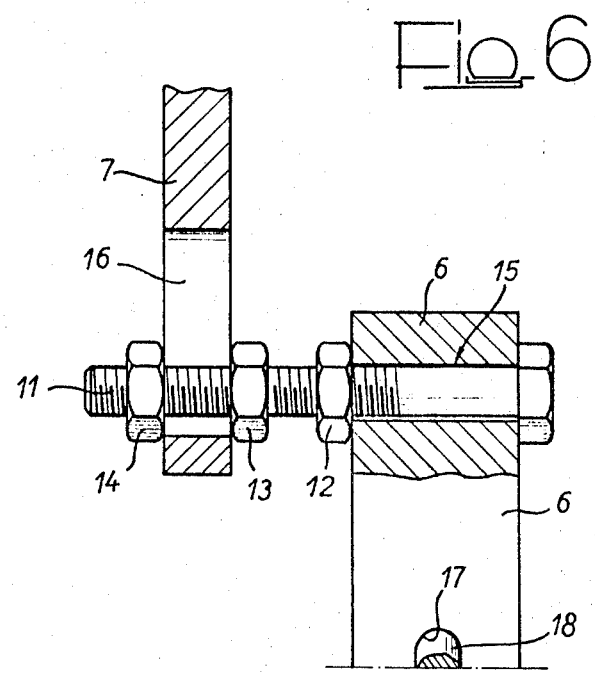

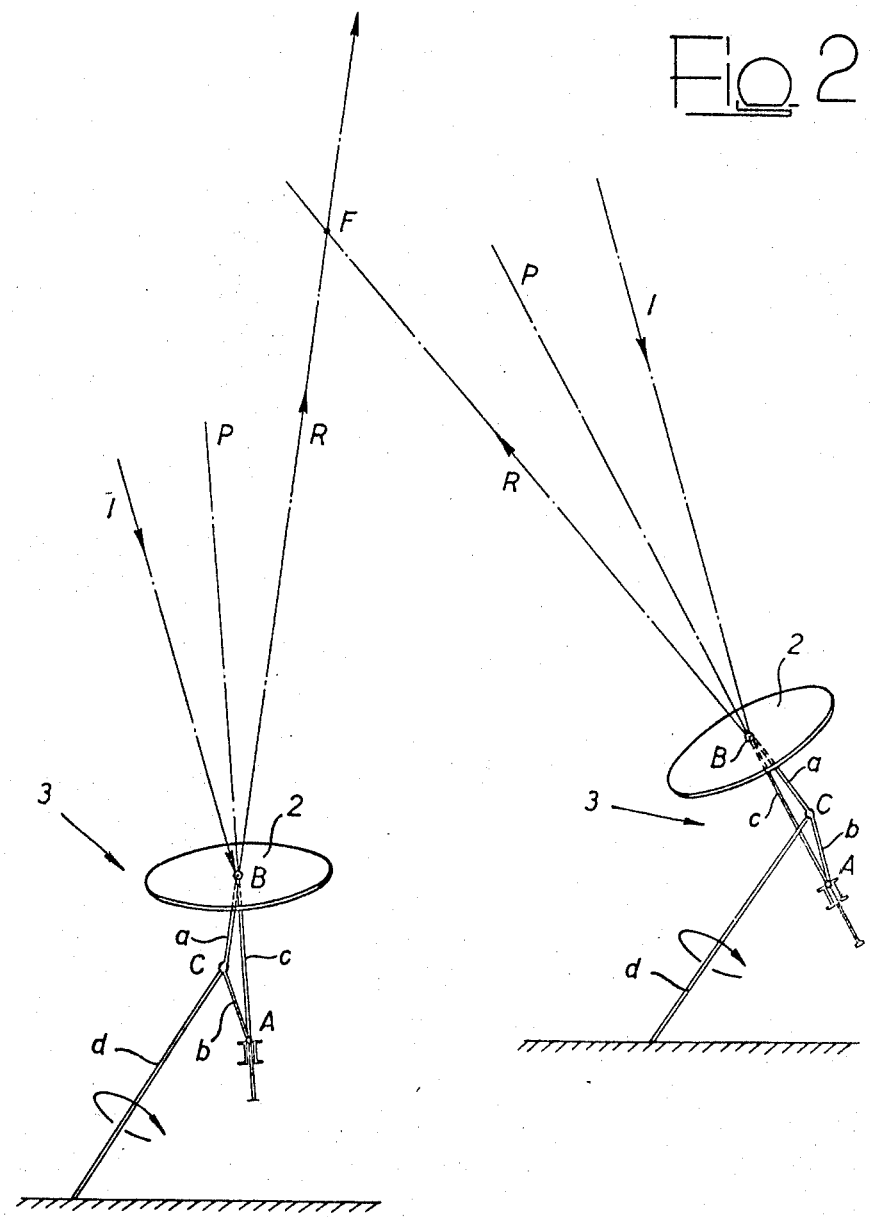

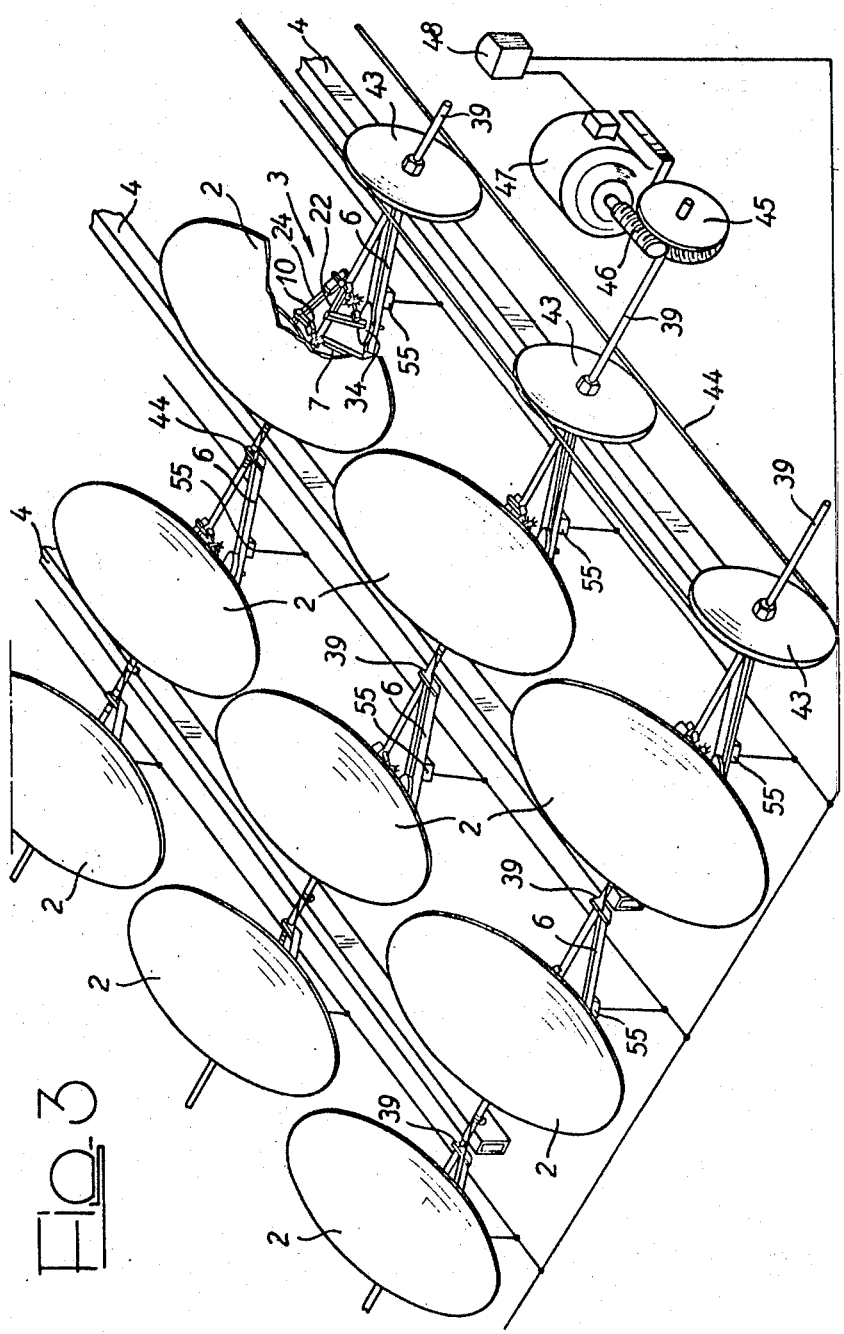

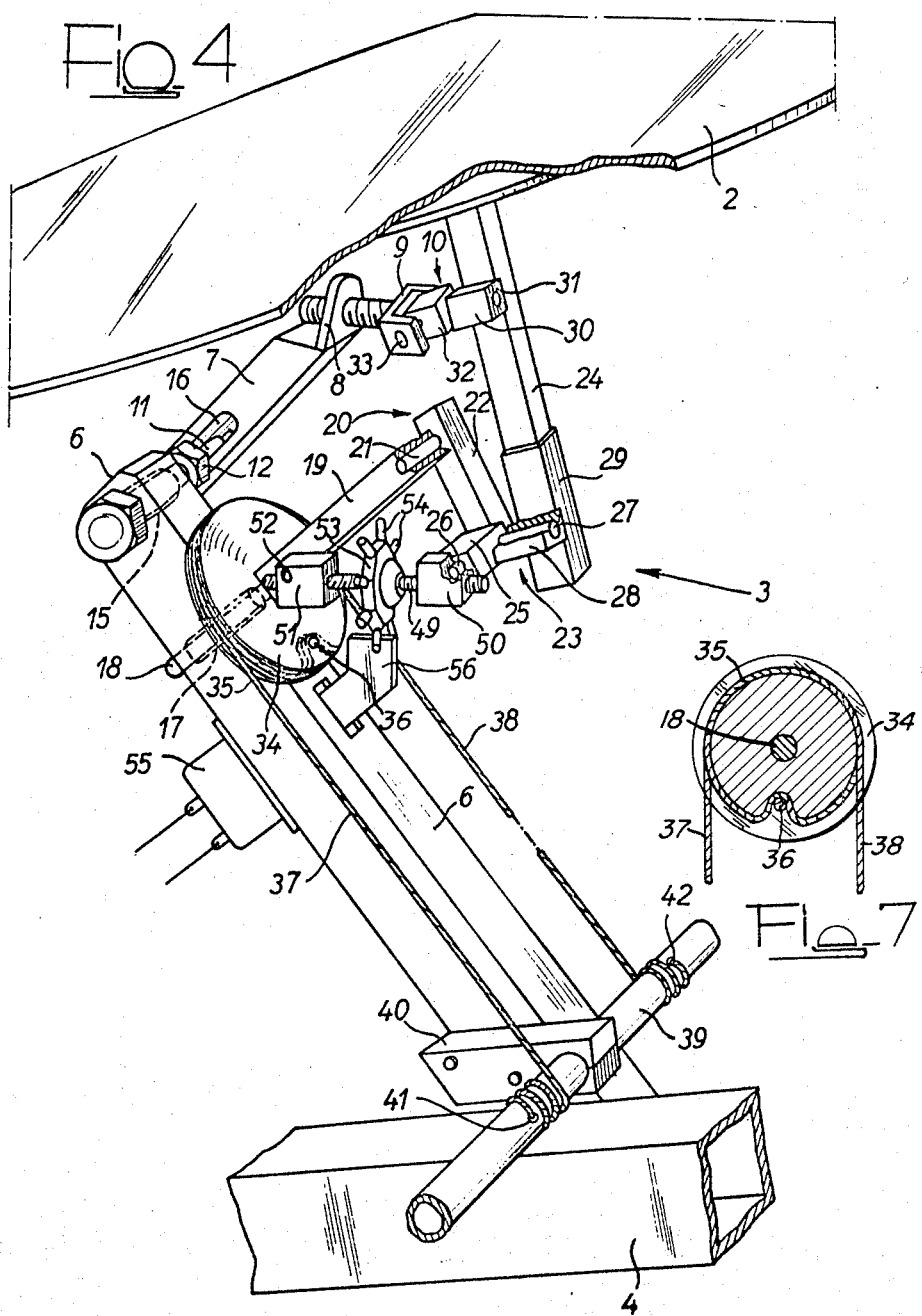

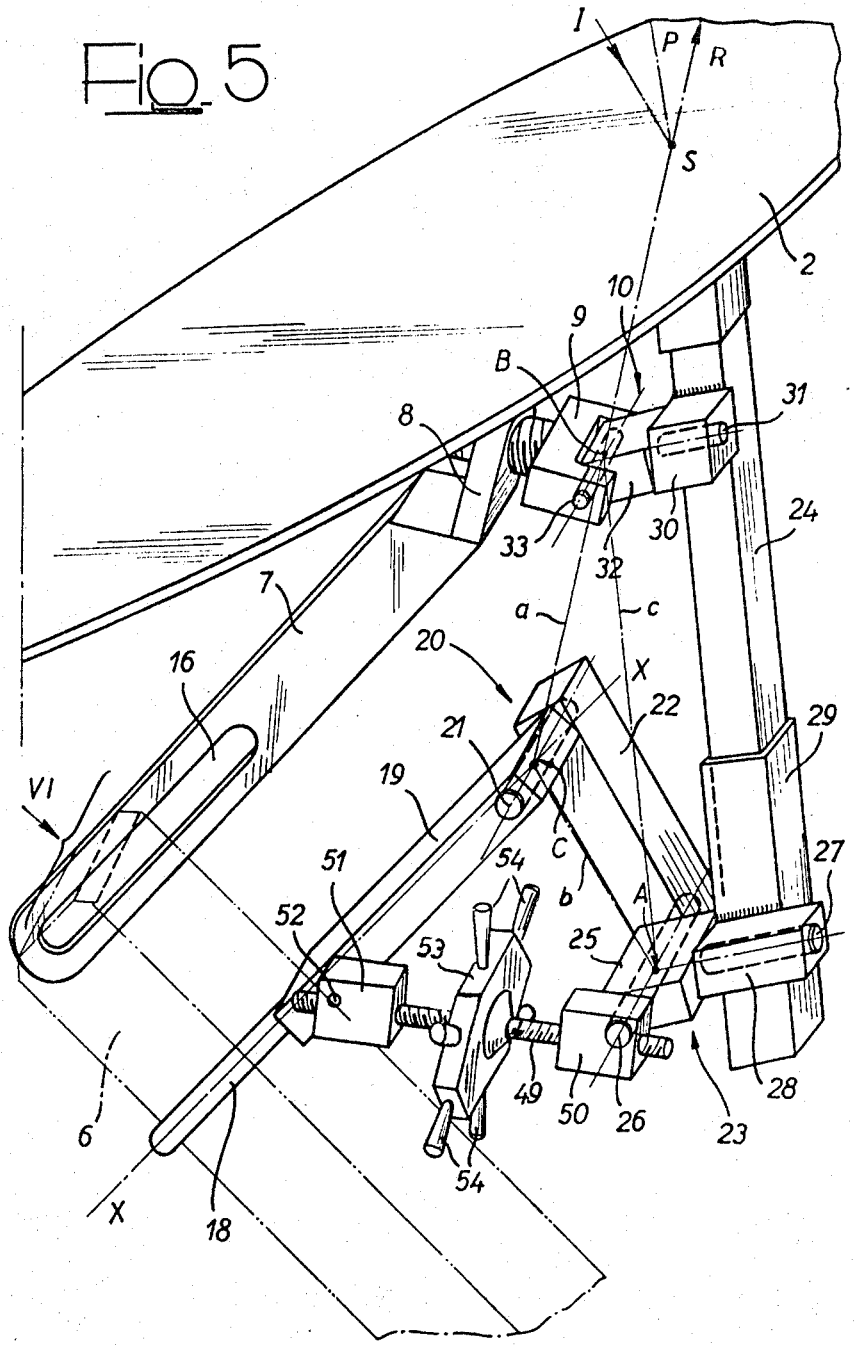

United States Patent Office 3,466,119
Patented Sept. 9, 1969

3,466,119
MULTIPLE MIRRORED APPARATUS UTILIZING SOLAR HEAT
Giovanni Francia, 11–13 Via Vassallo, Genoa, Italy
Filed Apr. 7, 1966, Ser. No. 540,864
Claims priority, application Italy, Apr. 10, 1965, 8,955/65
Int. Cl. G02b 5/08
U.S. Cl. 350—299                    4 Claims

ABSTRACT OF THE DISCLOSURE

A reflecting surface formed from a plurality of mirrors designed to utilize solar heat wherein each of the mirrors includes a supporting device comprising a frame which includes a plurality of articulated rods joined to one another. The rods are joined such that the points of articulation of the four rods are arranged at the apexes of an isoceles triangle whereby cooperating movement between the four rods maintains the incident rays of the sun on the reflecting surface which is being supported. Control means cooperate with the rods so as to keep the mirror in constant movement so as to compensate for the earth's rotation and maintain the incident rays of the sun directly on the reflecting surface.

---

This invention relates to devices for supporting a plurality of mirrors forming a reflecting surface in apparatus utilizing solar heat.

Apparatus of this type are known in which the reflecting surface comprises a plurality of movable mirrors turned towards the sun, inclined to one another in order to concentrate the rays reflected by the mirrors into a focus in which the center of a device utilizing sun energy, such as a heat exchanger is positioned.

In such apparatus the inclination of each mirror is steadily varied in order to maintain said focus in a fixed position. Each mirror is therefore secured to a frame formed by articulated rods, which is controlled by known devices, such as a clock work in order to follow the apparent movement of the sun.

This invention provides a supporting device comprising in association with each mirror a separate frame which is simple and inexpensive in construction, reliable in working and initially oriented with ease, the supporting device having the mirror frames each made up of a similar number of components which are similar to one another for all frames for the mirrors forming the reflecting surface.

With the above and further objects in view this invention provides a supporting device for a plurality of mirrors forming a reflecting surface of an apparatus utilizing solar heat of the type comprising a fixed base secured to the ground. The base includes a foundation of parallel girders and fixed arms, and has attached thereto a plurality of mirror-carrying frames each comprising four rods articulated to one another in such manner that each rod is articulated to at least one other rod. The articulations have their centers situated at the vertices of an isosceles triangle. The first rod is secured to an associated support arm which is attached to one of the parallel girders and articulated to the second rod at the vertix between the equal sides of the triangle. The second rod has its articulations arranged on one of the equal sides of the triangle and is provided with control means adapted to vary its inclination with respect to the first rod in order to arrange the second rod constantly in the direction of the incident rays on the reflecting surface. The third rod is arranged along the base of the triangle and is provided with means for varying its length and for attachment of the mirror perpendicular to the rod. The first rod comprises a portion of a U-shaped structure which further includes the upper portion of the main support arm. The first rod of the U-shaped structure has its axis extending parallel with the earth axis and is mounted for rotation about its axis and provided at its free end with a pivot. The axis of the pivot intersects the first rod axis at a point forming a vertex of the triangle. A fourth rod comprising a portion of the U-shaped structure is provided at its end with a cardan joint, the center of which forms a second vertex of the triangle. The fourth rod is secured to the support arm in an adjustable manner, whereby the center of the cardan joint can be displaced over a spherical surface having its center at first mentioned vertex of the triangle. Means are provided for rotating the first rod about its axis and for varying the angle between the first rod and the second rod of the mirror frame.

The invention shall now be described with reference to the accompanying drawings which show by way of example an embodiment thereof, and wherein:

FIGURE 1 is a diagrammatical view of an apparatus utilizing solar heat:

FIGURE 2 is a diagrammatical view of two mirrors supported in a known manner so that the reflected rays concentrate in a common focus;

FIGURE 3 is a perspective view of a portion of the reflecting surface comprising the mirrors and supporting device;

FIGURE 4 is a perspective view of a mirror together with its support and control mechanisms;

FIGURE 5 is a perspective view on an enlarged scale of a detail of FIGURE 4; and FIGURE 6 is a detail view of FIGURE 4 seen in the direction of the arrow VI.

FIGURE 7 is a plan view of an enlarged portion of FIGURE 4.

Referring to FIGURE 1, 1 denotes the reflecting surface comprising a plurality of adjacent mirrors 2, each supported by an articulated frame 3 through which the mirrors 2 can be properly inclined in order to reflect the incident sun rays I on the surface 1 to form a bundle of rays R converging in a common focus F situated above the reflecting surface 1.

A device for converting the sun energy reflected by the mirrors to another form of utilizable energy, such as a heat-exchanger H, is supported by means of a structure (not shown) so that its centre coincides with the focus F.

FIGURE 2 diagrammatically shows the manner previously known in the art of heliostats of supporting each mirror 2 of a reflecting surface by means of an articulated frame 3.

Each frame 3 comprises essentially three rods $a$, $b$, $c$, articulated to one another to form an isosceles triangle by means of articulations arranged at the apexes of the triangle.

The frame formed by rods $a$, $b$, $c$, is supported at the articulation C by a rod $d$ extending parallel with the earth axis and rotatable about its axis at a constant speed of 15° per hour.

The rod $b$ forms with the rod $d$ an angle of 90° less the declination of the sun to the rod and is kept parallel with the direction of the incident sun rays I. The rod $a$, which is of the same length as the rod $b$, is kept in the direction of the rays R reflected towards the focus F, so that the rod $c$, to the end of which the mirror 2 is transversely attached, takes a direction of the bisectrix P of the angle between the incident ray I and reflected ray R.

FIGURES 3 and 4 show the device according to this invention for supporting a plurality of circular mirrors 2 conveniently arranged at the corners of a square mesh network to form the reflecting surface 1.

The device comprises a foundation made up of a plurality of equidistant parallel girders 4 extending in the direction N-S, each having rigidly secured thereto parallel and equidistant arms 6, arranged in a vertical plane extending parallel with the earth axis. The arms 6 are inclined to a horizontal plane at an angle equalling the co-latitude of the locality.

The free end of each arm has secured thereto a rod 7 provided with a tab 8 to which a member 9 of a cardan joint 10 is secured. The rod 7 is attached to the arm 6 by means of a bolt 11 provided with clamp nuts 12, 13, 14, extending through a hole 15 bored in the arm 6 and a slot 16 provided in a longitudinal direction in the rod 7.

The spacing and mutual inclination of the rod 7 and arm 6 as well as the length of the rod 7 can be varied as required by moving the rod 7 with respect to the bolt 11.

The end portion of the arm 6 has bored therethrough a further hole 17 spaced from the hole 15 and having journalled therein about its axis X—X a pivot 18 for a rod 19, extending perpendicular to the arm 6 and situated in the same plane as the arms 6 secured to one and the same girder 4, whereby the rod 19 is parallel to the terrestrial axis.

The free end of the rod 19 has hinged thereto at 20 by means of a pivot 21 one end of a rod 22 connected at its other end by a cardan joint 23 to a rod 24. The axis of the pivot 21 intersects the axis X—X of the pivot 17 at a point C.

The joint 23 comprises a block 25 journalled on a pivot 26 secured to the rod 22 and is provided with a pivot 27 the axis of which intersects the axis of the pivot 26 at a point A. Point A comprises the center of cardan joint 23. The pivot 27 is journalled in a stud 28 secured to a tubular guide 29 having mounted therein for axial displacement a rod 24 carrying at its upwardly directed end a mirror 2 extending perpendicular to the rod 24.

A stud 30 is secured to an intermediate portion of the rod 24 and has pivoted thereto by means of a pivot 31 a member 32 of the cardan joint 10, connected by a pivot 33 to the member 9.

The axes of the pivots 31, 33 intersect at a point B which comprises the center of cardan joint 10.

In order to concentrate the rays R reflected by the mirrors 2 in the focus F, each frame 3, the rod 19 of which is now parallel to the terrestrial axis, should be adjusted so that the spacing of the points B, C, equals the spacing of the points A, C, and the line extending through the points B, C is directed towards the focus F.

For this purpose the nuts 13, 14 on the bolt 11 are slackened and a telescope (not shown) is inserted between the free end of the rod 19 and member 9 of the cardan joint 10. The telescope is provided with a caliper gauge adapted to maintain a spacing of the points B, C equalling the spacing of the points A, C, the line B-C, coinciding with the optical axis of the telescope being directed towards the focus F by viewing through the telescope.

When directing the line B-C towards the focus F, the point C remains stationary, whereas the point B is moved over a spherical surface having its center at the point C and its radius equalling the spacing B-C which is kept constant by means of the gauge. When the line B-C extends towards the focus F, the bottom end of the previously released rod 7 is locked by tightening the nuts 13, 14, so that the center S of the mirror 2 is situated on the line B-C.

The frame in FIGURE 3 fulfills the conditions diagrammatically shown in FIGURE 2, the rods 19, 22, 24 corresponding to the rods $d$, $b$, $c$, respectively, the U-shaped unit comprising the rod 19, end portion of the arm 6 between the holes 15, 17, the intermediate portion of the screw 11, rod 7 and member 9 of the cardan joint 10 forming between the points B and C an equivalent of rod $a$.

A pulley 34 is keyed to the rod 19 of each frame and has a flexible cable 35 travelling thereon As shown in FIGURE 7, the cable is held securely against the pulley 34 by a peg 36 to prevent relative slipping.

The sides 37, 38 of the cable 35 have their end portions wound in opposite directions about a shaft 39 journalled in supports 40 each secured to an arm 6. The ends of said arms are held in radial holes 41, 42, respectively, bored in the shaft 39.

In order to simultaneously move all the mirrors 2 forming the reflecting surface 1, each row of mirrors 2 transversely arranged with respect to the girder 4 is controlled by a shaft 39 extending throughout the whole length of the row. The shafts 39 of all rows are connected by a transmission comprising a toothed wheel 43 keyed on each of said shafts and an endless chain 44 engaged by all the wheels 43. A toothed wheel 45 keyed to one shaft 39 meshes with a worm screw 46 rotated by a motor 47.

The motor 47 is reversible and is controlled by a programing device 48 in order to rotate during the day the rod 19 on each frame 3 in a constant direction and at a constant speed through 15° per hour, so that the mirrors 2 follow the apparent movement of the sun, whereas during the night the rods 19 are rotated in a reverse direction in order to move the mirrors 2 to their initial position.

Each frame 3 is provided with a device adapted to vary the inclination of each respective mirror following the angle of declination of the sun. The device comprises a right-handed and left-handed screw 49 screwed at one end into a stud 50 pivoted to the pivot 26 on the cardan joint 23. The other end of the screw 49 is screwed into a stud 51 pivoted by means of a pivot 52 to the portion of the rod 19 adjacent the wheel 34, so that the screw 49 forms jointly with the rods 19, 22 a triangle articulated at its apexes.

On rotation of the rod 19 and either direction the screw moves in the same direction and travels over the arm 6 once by day and once by night.

The screw 49 is provided intermediate the two screw threads with a hexagonal head 53 having six radial spikes 54.

A solenoid 55 is mounted on the rod 6 and in its energized condition places a movable stop 56 into the path of the spikes 54 so that when the screw 49 travels over the arm 6 one spike 54 bears against the stop 56 and rotates the screw 49 through one sixth of a turn. The angle between the rods 19 and 22 is changed and the inclination of the mirror 2 is varied through an angle corresponding to the maximum variation in declination, whereafter the solenoid 55 is deenergized in order to withdraw the stop 56.

During the summer months the solenoid 55 is actuated once every 24 hours, whereas during other periods of the year when the variation in inclination is smaller, the solenoid is operated every second or third day, as required.

When the angle of declination of the sun increases, the solenoid 55 should be operated in order to screw-in the screw 49 into the studs 50, 51. Therefore, the stop 56 is moved to intercept the path of the spikes 54 when the screw 49 travels over the arm 6 moving in one direction, whereas when the declination decreases the stop 56 is moved to intercept said path when the screw 49 moves in an opposite direction.

The solenoids 55 of all supports 3 are simultaneously energized by the programming device 48.

What I claim is:

1. Device for supporting a plurality of mirrors forming a reflecting surface of an apparatus utilizing solar heat of the type comprising a plurality of equidistant parallel girders forming the foundation of the device, a plurality of parallel and equidistant arms each arranged in a vertical plans extending parallel with the earth axis and inclined to a horizontal plane at an angle equalling the co-latitude of the locality, each of said arms carrying a mirror through the interposition of a frame comprising:

(a) a first rod supported by the arm so as to be able to rotate about its own longitudinal axis and extending perpendicularly to said arm;

(b) a second rod hinged to said first rod by means of a pivot secured near one end of said second rod and having the axis of the pivot intersecting the axis of said first rod;

(c) a tubular guide and a third rod telescoping therein;

(d) a first cardan joint connecting said tubular guide and the other end of said second rod;

(e) a mirror mounted at the end of said third rod opposite said guide, such that the mirrors optical axis is coaxial with the axis of the third rod;

(f) a fourth rod secured by means of a slot and bolt connection to said arm, wherein said bolt is perpendicular to the vertical plane containing said arm and the axis of said first rod;

(g) a second cardan joint interconnecting one end of said fourth rod to said third rod;

(h) means for simultaneously moving all the mirrors forming the reflecting surface, and (i) means for varying the inclination of said second rod with respect to said first rod and thereby the inclination of the mirrors following the angle of declination of the sun, such that the axis of said second rod is constantly directed toward the sun, the position of said fourth rod with respect to said arm being so chosen and the inclination of said second rod with respect to said first rod being always so adjusted that a line extending through the point of intersection of the axis of said first rod with the axis of said pivot fast with said second rod, and through the center of said second cardan joint extends toward the focus of the mirror, and the centers of said first and second cardan joints are equidistant from the above said point of intersection.

2. Device as set forth in claim 5 wherein said means for simultaneously moving the mirrors forming the reflecting surface comprise in association with each frame a pulley keyed to said first rod, a cable wound over said pulley and having both its end portions wound in opposite directions on a shaft driven by a reversible motor controlled by a programming device.

3. Device as set forth in claim 1, wherein said means for varying the inclination of said second rod with respect to said first rod comprises a right-handed and a left-handed screw having its ends screwed into studs pivoted to said rods, the intermediate portion of the screw being provided with a plurality of radial spikes, a movable stop being provided at said arm and control means periodically actuated in order to move said movable stop and to intercept the path of said spikes.

4. Device as set forth in claim 3 wherein said control means for said movable stop comprise a solenoid energized once every second or third day during other periods of the year.

References Cited

FOREIGN PATENTS 986,969  4/1951  France.
326,516  9/1920  Germany.

DAVID SCHONBERG, Primary Examiner

J. W. LEONARD, Assistant Examiner

U.S. Cl. X.R.

126—270; 350—293; 353—3